United States Patent [19]
Yamamoto et al.

[11] Patent Number: 5,134,354
[45] Date of Patent: Jul. 28, 1992

[54] SERVO MOTOR CONTROL APPARATUS

[75] Inventors: Yoichi Yamamoto; Takayuki Tohya, both of Kitakyushu; Yoshiji Hiraga, Iruma, all of Japan

[73] Assignee: Kabushiki Kaisha Yaskawa Denki Seisakusho, Fukuoka, Japan

[21] Appl. No.: 623,410
[22] PCT Filed: Apr. 6, 1990
[86] PCT No.: PCT/JP90/00472
  § 371 Date: Dec. 3, 1990
  § 102(e) Date: Dec. 3, 1990
[87] PCT Pub. No.: WO90/12448
  PCT Pub. Date: Oct. 18, 1990

[30] Foreign Application Priority Data

Apr. 10, 1989 [JP] Japan .................................. 1-91640

[51] Int. Cl.$^5$ .............................................. G05B 11/36
[52] U.S. Cl. ..................... 318/609; 318/610; 318/611; 318/561; 318/616; 364/161; 364/162
[58] Field of Search ............... 318/609, 610, 611, 561, 318/616, 615; 364/161, 162

[56] References Cited
U.S. PATENT DOCUMENTS

| | | | |
|---|---|---|---|
| 4,743,822 | 5/1988 | Futquri et al. | 318/610 |
| 4,851,754 | 7/1989 | Sakamoto et al. | 318/616 |
| 4,882,526 | 11/1989 | Iino et al. | 318/561 |
| 4,999,557 | 3/1991 | Inoue | 318/609 |

Primary Examiner—William M. Shoop, Jr.
Assistant Examiner—Saul M. Bergmann
Attorney, Agent, or Firm—Jordan and Hamburg

[57] ABSTRACT

When a workpiece is cut or otherwise machined by a machine using a servo motor control apparatus having a position feedback loop, a velocity feedback loop, and a current feedback loop, it is the common practice to preset the instructed current value to a voltage corresponding to friction torque when rotation of the motor is started or reversed. This is to compensate for the response delay of the motor introduced by the friction torque. The present invention relates to improvements in this technique. After the instructed motor velocity changes from a positive value, to a negative value or vice versa, or after the detected motor velocity changes from a positive value to a nonpositive value or from a negative value to a nonnegative value, the value of the integration element of a velocity control portion is reversed according to a function. The obtained output value is added to the instructed current value or to the integration term to compensate for the response delay, thus reducing machining error.

5 Claims, 8 Drawing Sheets

FIG. 5a CONSTANT INCREASING TYPE

FIG. 5b EXPONENTIAL FUNCTION TYPE

FIG. 5c S-TYPE

FIG. 6c  S TYPE

FIG. 6b  EXPONENTIAL FUNCTION TYPE

FIG. 6a  CONSTANT INCREASING TYPE

SERVO MOTOR CONTROL APPARATUS

Field of Art

The present invention relates to an apparatus which controls a servo motor that drives a machine tool to machine an object according to instructions from an command function generator and, more particularly, to a technique for compensating for the delay of the response of a servo motor incorporated in a machine whose internal characteristics differ according to direction because of gravity or other reasons, the delay being introduced when the motor is reversed or started.

BACKGROUND OF THE INVENTION

Figure 1:
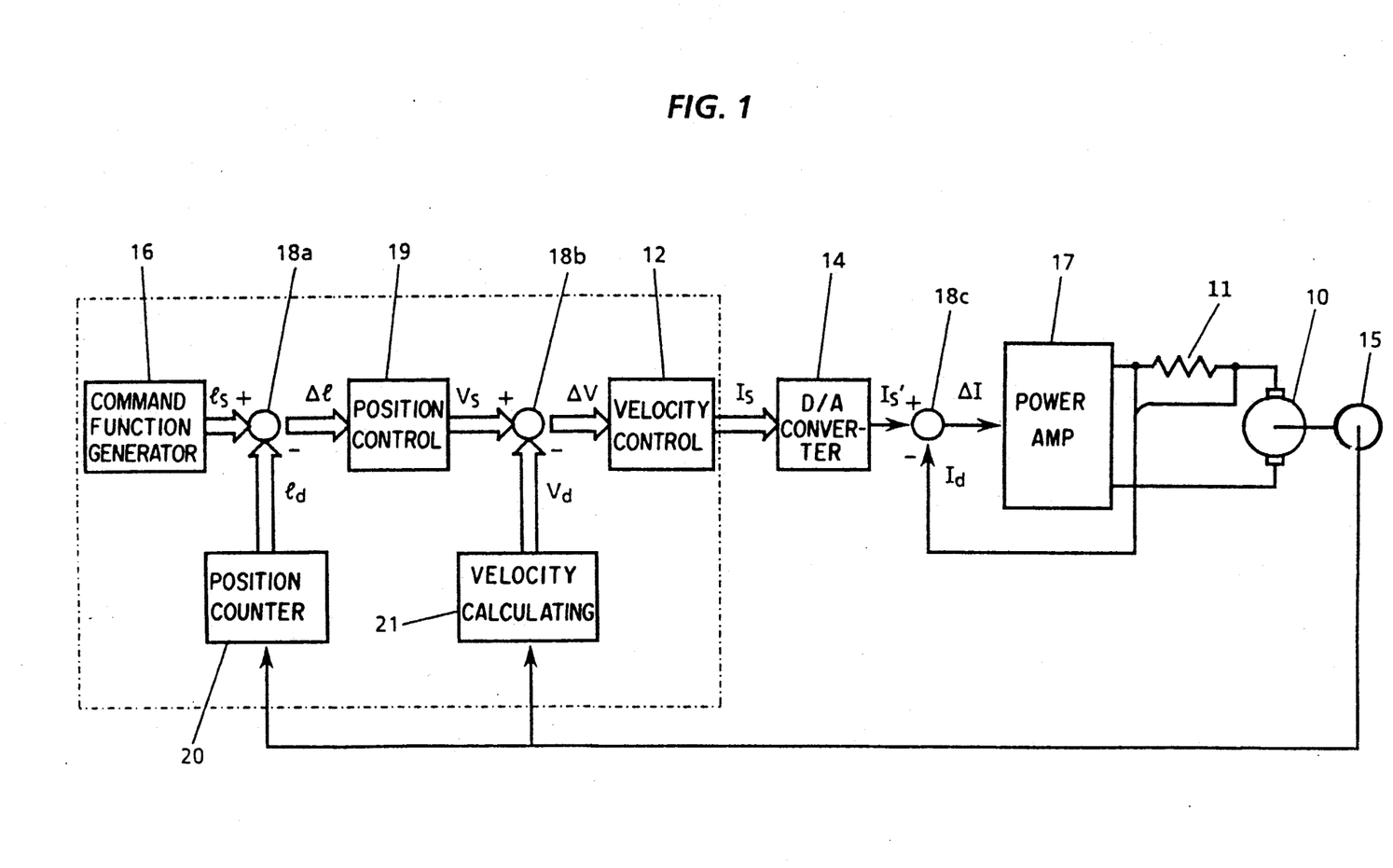
FIG. 1 is a circuit diagram of the prior art servo motor control circuit.

As shown in FIG. 1, a servo motor control circuit having a position feedback loop and a digitally controlled velocity loop is generally equipped with both a velocity feedback loop for controlling the rotational speed of a motor 10 and a current feedback loop for controlling the current flowing through the motor 10. In addition there is the position feedback loop for controlling the position, angular or otherwise of the movable mechanical part (not shown) of the motor 10. In the current feedback loop, the motor current $I_d$ is controlled so that instructed analog current $I_s'$ equals motor current $I_d$, as detected with a resistor 11. The motor velocity is controlled so that the difference $\Delta V$ between motor velocity $V_d$, found by a velocity-calculating portion 21, and velocity $V_s$, instructed from a position control portion 19, is reduced down to zero. The motor position is controlled by the position feedback loop in such a way that the difference $\Delta l$ between position $l_d$ and instructed value $l_s$ produced from an command function generator 16 is reduced down to zero. The position $l_d$ is detected by a position detector 15 such as a pulse encoder or a linear scale and counted by a position counter 20. Also shown in FIG. 1 are a velocity control portion 12, a D/A converter 14, a power amplifier 17, and subtracters 18a, 18b, 18c.

In the area surrounded by the dot-and-dash line, signals are processed digitally. Digital signals are indicated by $\rightrightarrows$, while analog signals are indicated by $\rightarrow$. Usually, the position control section 19 performs an arithmetic function given by $$V_s = K_p \cdot \Delta l \qquad (1)$$

where $K_p$ is a constant. Where the velocity is controlled by making use of PI (proportional plus integration) action, the velocity control portion 12 performs arithmetic functions given by $$\begin{matrix} I_{rP} = K_v \cdot \Delta V \\ I_{rI} = K_I \cdot \Sigma \Delta V \\ I_r = I_{rP} + I_{rI} \end{matrix} \Bigg\} \qquad (2)$$

where $K_v$ and $K_I$ are constants, and $\Sigma$ means summation. Where the velocity is controlled by making use of I-F action, the velocity control portion 12 which determines the relation among the instructed velocity $V_s$, the velocity $V_d$, and the instructed current 1, performs arithmetic functions given by $$\begin{matrix} I_{rI} = K_I \cdot \Sigma \Delta V \\ I_{rP} = K_v \cdot V_d \\ I_r = I_{rI} + I_{rP} \end{matrix} \Bigg\} \qquad (3)$$

Figure 2A:
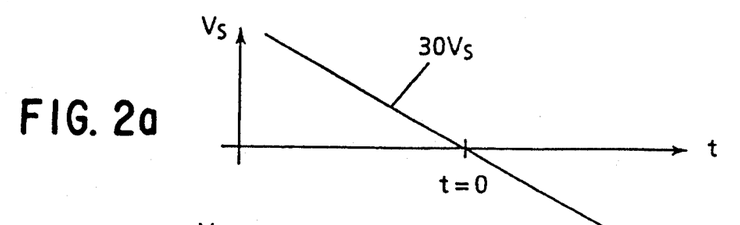
Figure 2B:
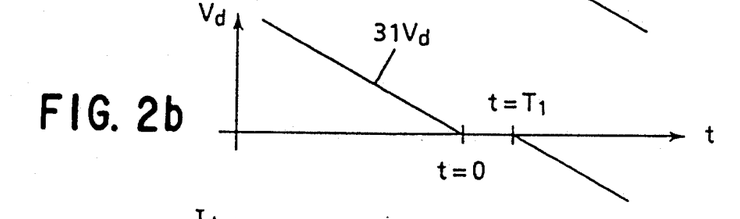
Figure 2C:
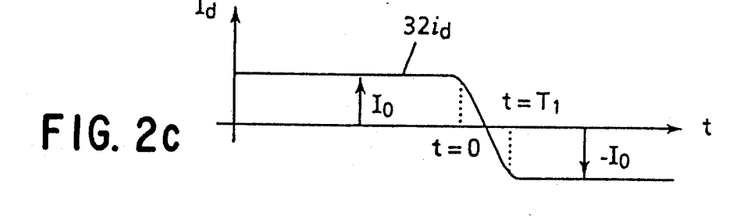

In the prior art servo motor control apparatus construction as shown in FIG. 1, if the rigidity of the motor shaft is ideal, then the instructed motor velocity $V_s$, and the motor current $I_d$, which are taken when the rotation of the motor is reversed, show characteristics as indicated by 30$V_s$, 31$V_d$, 32$i_d$, respectively, in FIG. 2. In these graphs, the instant at which an instruction for reversing the direction is given at the origin, these three characteristics $V_s$, $V_d$, and $I_d$ are plotted against time t. $I_o$ is a value obtained by transforming the friction torque produced in the machine into a motor current. In the illustrated sample, the instructed velocity is reduced at a constant rate, i.e., the acceleration is a constant negative value. As can be seen from these graphs, when an instruction for reversing the direction is entered at instant $t = 0$, the motor current $I_d$ indicated by the curve 32$i_d$ decreases gradually, but the velocity $V_d$ indicated by the curve 31$V_d$ is kept null until the motor current $I_d$ reaches $-I_o$, whereupon the motor begins to reverse. That is, a time delay of $T_1$ occurs between the instant at which an instruction for reversing the direction is entered and the instant at which the motor begins to reverse.

Figure 3:
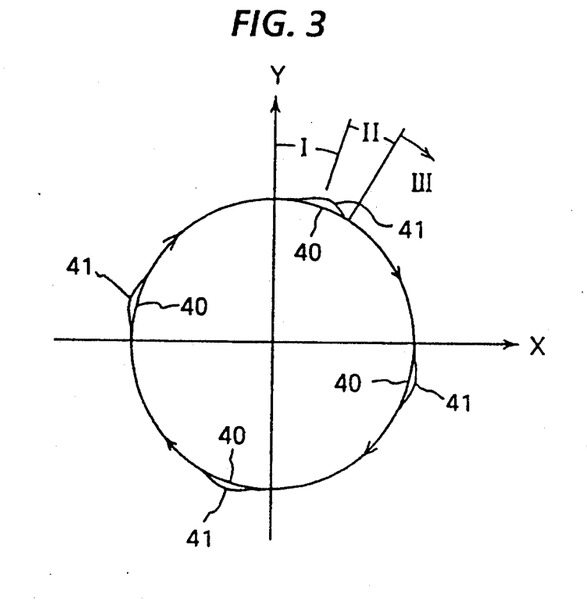
FIG. 3 is a diagram illustrating error introduced in machining a workpiece to fabricate a genuine circle.

Of course, this time delay produces an error in controlling the machining process. More specifically, as shown in FIG. 3, when a command pulse train is distributed along a genuine circle and a cutting work should be caused to proceed along the genuine circle as indicated by curve 40, the response is delayed for on reversal of the direction of the rotation. Therefore, in the portion in which the cut quadrant of the arc is switched, the actual cut portion has a bulge as indicated by curve 41.

This undesirable phenomenon is now described in further detail by referring to FIG. In arc I, only the X-axis moves, and the velocity assumes the maximum value. The Y-axis is at rest. In arc II, the Y-axis begins to move but a genuine circle is not attained. In arc III, both X- and Y-axes move, and a genuine circle trajectory is accomplished. When the Y-axis moves in one direction after kept at rest, the start of the movement is delayed, thus producing arcs I and II. If the machining deviation from the genuine circle is taken, a bulge appears.

Since the present numerical control uses only distribution of pulses to circles and straight lines, problems occur when machining work is done along an arc. In addition, when the direction of movement along one axis is instructed to reverse while the direction of movement along another axis is maintained constant (i.e., a trajectory in which a pause takes place being followed) for example a parabolic contour is followed, similar problems take place.

With respect to the start of the motor, it does not begin to move until the motor current $I_d$ exceeds $-I_o$, thus producing a time delay. Where instructed motor velocity $V_s$ and the degree of friction differ among the axes, as encountered on a machine having several axes such as a robot, it is inevitable that the effect of time delay differs among the axes. As a result, the trajectory deviates at the machine point.

In view of these problems, the present applicant has already proposed an improved method of reversing the sign of the integration term obtained from the velocity control portion 12 without changing the absolute value at the instant of the reversal of the direction, or for setting the integration term to a certain value at the instant of reversal by making use of the fact that the voltage determining the instructed current value $I_s$ when an instruction for reversing the direction is entered is in proportion or corresponds to the sum of friction torque, torque equivalent to work to the outside, and acceleration torque, as well as making use of the fact that the voltage determining the instructed current value $I_s$ is the value of the integration term of the velocity control portion 12, since the instructed velocity $V_s$ and the motor velocity $V_d$ are almost null, as disclosed in Japanese Patent Laid-Open Nos. 150688/19876, 150689/1986, 150690/1986, and 173684/1986.

In this method however the instructed current value $I_s$ is changed in a step by step fashion. This produces the possibility that the response of the motor becomes excessive because of the resilience determined by the rigidity of the motor shaft. For this reason, a workpiece may be machined excessively.

DISCLOSURE OF THE INVENTION

It is a goal of the present invention to provide a control apparatus which solves the problems with the prior art control already described in connection with FIG. 1 and the problems with the control already proposed by the present applicant as described above. Where the velocity control portion uses a microcomputer to perform its processing, it compensate for the response delay of a motor introduced by friction torque, when the rotational direction of the motor is reversed, to thereby enhance control accuracy.

It is another goal of the invention to provide a control apparatus which, when a motor begins to move, compensates for the response delay introduced by friction torque by use of a means similar to the means used upon reversal of the rotational direction of the motor, to enhance the control accuracy.

The first embodiment of the invention comprises a servo motor control apparatus having a velocity control portion consisting of a microcomputer, a motor velocity feedback loop (with either a motor torque feedback loop or a motor current feedback loop formed inside the velocity feedback loop) and a controller included in the velocity control portion having at least proportional and integrated elements.

This servo motor control apparatus further includes a means which reverses the sign of the value of the integration element of the velocity control portion by using a function which smooths a stepwise change of the input. The function may be, for example, a constantly increasing function, an exponential function, or an S-shaped function, and adds the output value either to the instructed current value or to the integration term. This is done after the value of the instructed motor velocity changes from a positive value to a negative value or vice versa, or after the detected velocity of the motor changes from a positive value to a nonpositive value or from a negative value to a nonnegative value.

A second embodiment of the invention is based on the servo motor control apparatus described above and further includes a means which changes the value of the integration element of the velocity control portion according to the function, so that the value may correspond to positive or negative friction, depending, respectively, on whether the motor rotates forwardly or rearwardly. It also adds the output value to the instructed current value or the integration term after the instructed motor velocity changes from a positive value to a negative value or vice versa, or after the detected velocity of the motor changes from a positive value, to a nonpositive value or from a negative value to a nonnegative value.

A third embodiment of the invention is based on the servo motor control apparatus described above and further includes a means which changes the value of the integration element of the velocity control portion according to function, so that the value may become equal to a value corresponding to positive or negative friction, depending respectively, on whether the motor rotates forwardly or rearwardly, and adds the output value either to the instructed current value or to the integration term after the instructed velocity of the motor changes from zero to a nonzero value.

In the first embodiment of the invention, the input applied to the instructed current value $I_s$, used in the control method proposed by the present applicant, is passed through a filter element rather than being changed in a stepwise fashion to prevent excessive response of the motor. Also, the required time is reserved for the instructed current value $I_s$ to reach the sum of friction torque, torques equivalent to work done to the outside, and acceleration torque.

In the second embodiment of the invention, the final output value used when the function output value Q is found is set at $-2 \cdot I_r I$, where $I_r I$ is the integration term of the velocity control portion. In the second embodiment of the invention, when the direction is varied from a positive value to a negative value, the integration term of the velocity control portion is set to stationary negative value $-I_r I$. When the direction is varied from a negative value to a positive value, the integration term is set to stationary positive value $-I_r I$. If the value corresponding to the friction is previously known by calculations, actual measurement, or state observer's method, then the integration term can be determined based on the known value. Hence, the control apparatus can cope with cases where positive characteristics differ greatly from negative characteristics, is particular where the effect of gravity is great. Consequently, the second embodiment can yield the same advantages as the first embodiment.

The third embodiment of the invention differs only in the timing at which the function output value Q is added to the instructed current value or to the integration term of the velocity control portion when the motor begins to move. Consequently, the third embodiment can yield the same advantages as the second embodiments.

Other objects and features of the invention will appear in the course of the description thereof which follows.

BRIEF DESCRIPTION OF THE DRAWINGS

FIG. 2, (a), (b), (c) are response diagrams of the instructed velocity of a servo motor, the detected velocity of the motor, and the electric current flowing through the motor when the motor is reversed;

FIG. 5 (a), (b), (c) are graphs of functions used in the present invention;

FIG. 6 (a), (b), (c) are flowcharts illustrating programs for realizing the functions shown in FIG. 5, (a), (b), (c), respectively;

BEST MODE FOR CARRYING OUT THE INVENTION

Figure 4:
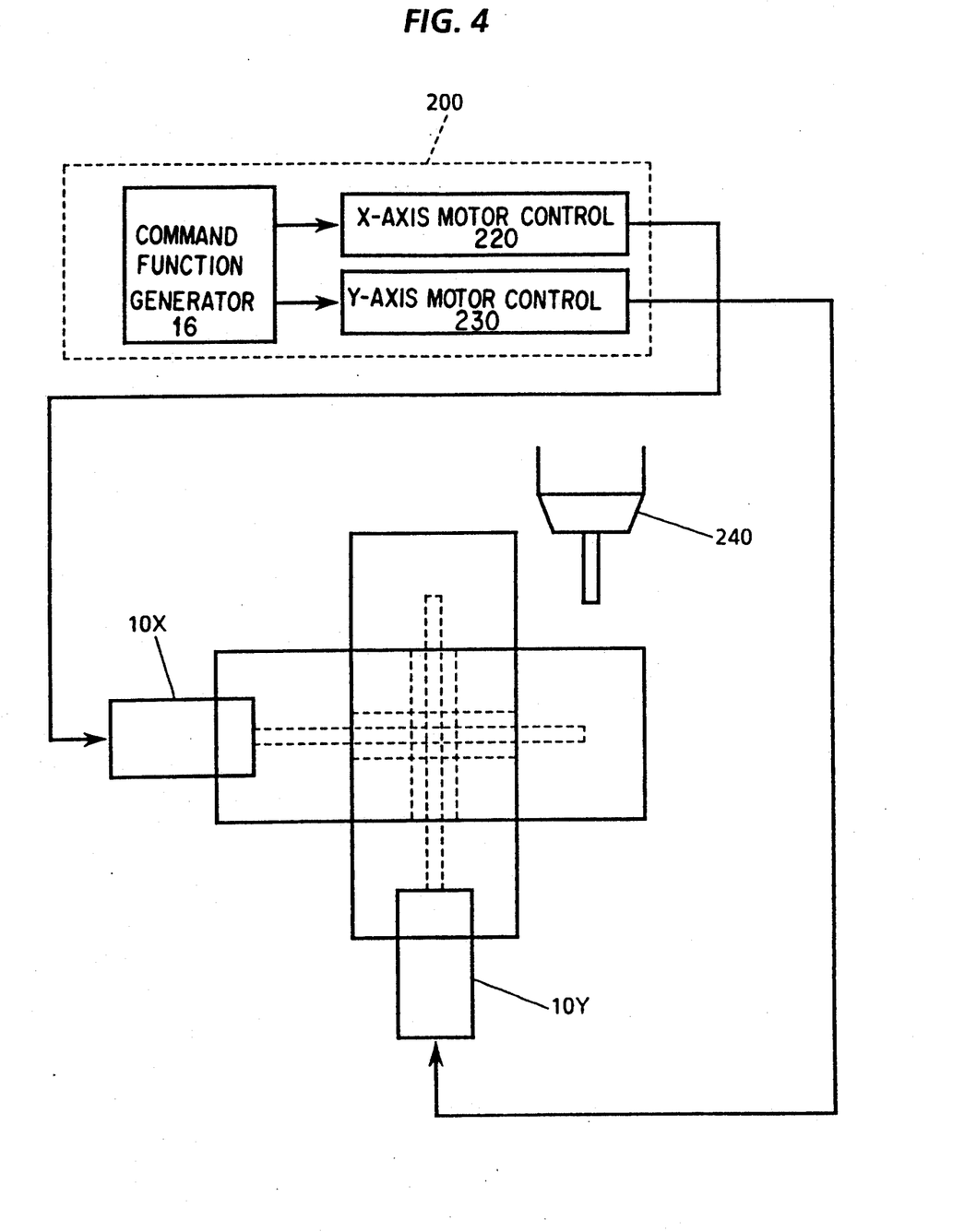
FIG. 4 is a block diagram of a control apparatus according to the invention.

FIG. 4 shows a control apparatus embodying the concept of the present invention. This apparatus comprises a numerically controlled machine 200, a command function generator 16, an X-axis motor control section 220, a Y-axis motor control section 230, a cutting machine 240, an X-axis motor 10X, and a Y-axis motor 10Y.

The numerically controlled machine 200 is similar to the prior art machine shown in FIG. 1 except that a function of performance processing upon detection of the reversal of the direction of the rotation is added to the velocity-calculating portion 21, and another function is added to the velocity control portion 12 to perform further processing.

Figure 5A:
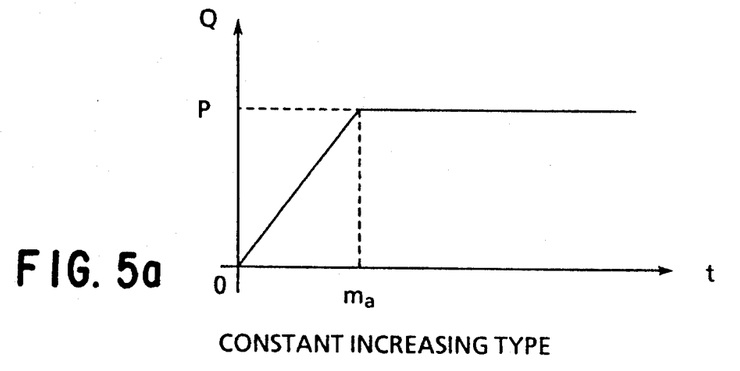
Figure 5B:
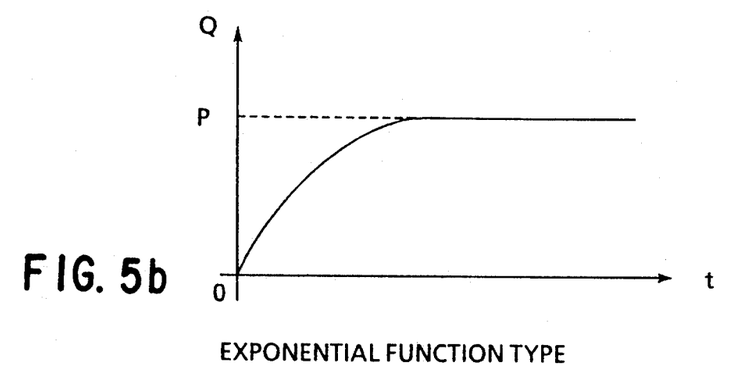
Figure 5C:
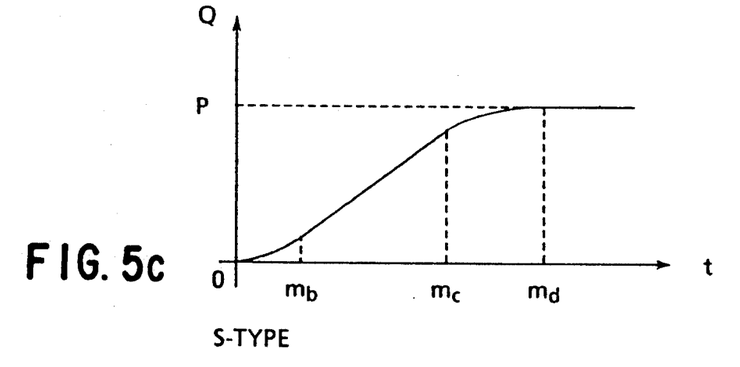
Figure 6A:
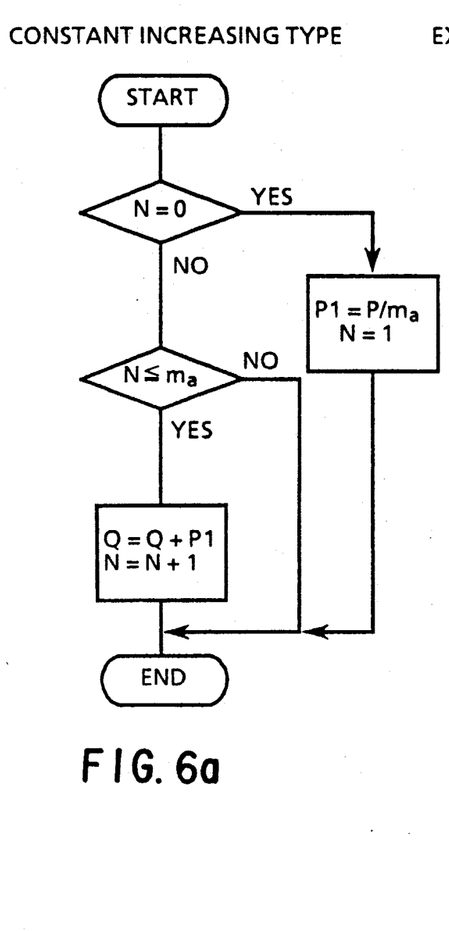
Figure 6B:
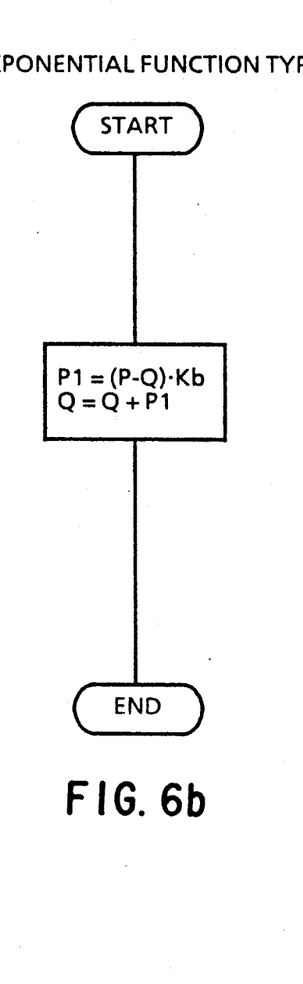
Figure 6C:
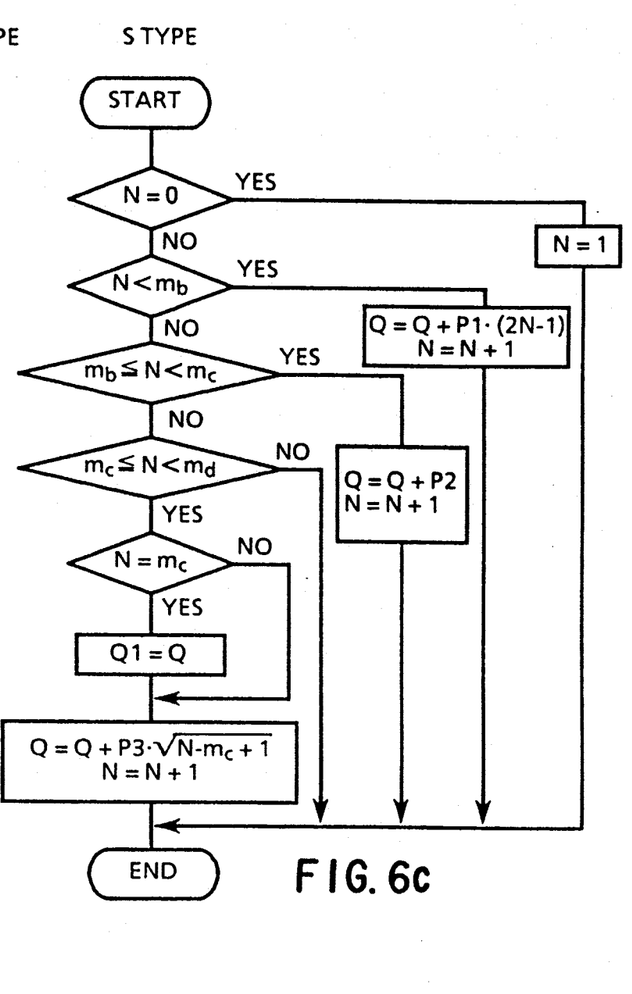

These differences are now described in detail. The processing performed upon detection of the reversal of the direction of the rotation is intended to change FLAG 1 from 0 to 1 when the motor velocity $V_d$ changes to zero from non-zero after the instructed motor velocity $V_c$ changes from a positive value to a negative value or vice versa, the FLAG 1 being incorporated as a control flag in the velocity control portion 12. The function portion of the control portion 12 shows response Q when an input, that prompts changes in a stepwise fashion is applied. The final output value of the function FILTER 1 is P. The kind of function may be determined, taking into account the friction torque characteristics of the cutting machine 240 and the motors 10X and 10Y. The time constant is decided depending on the acceleration torque value generated from the command function generator 16, on the adjusted gain of the servo loop, and also on the spring constant determined by the rigidity of the motor shaft. One kind of function increases at a constant rate, as shown in FIG. 5(a). Another kind changes exponentially, as shown in FIG. 5(b). A further kind varies like the letter S, as shown in FIG. 5(c). The function may be created outside the apparatus and take the form of a table, or may be programmed into the apparatus after preparing the flowchart of FIG. 6 (a), (b), or (c). In FIG. 6(a), $m_a$ is a constant. Under the initial condition, N=0 and Q=0. In FIG. 6(b), $K_b$ is a constant. Under the initial condition, Q=0. In FIG. 6(c), $m_b$, $m_c$, $m_d$, $P_1$, $P_2$, and $P_3$ are constants. Under the initial condition, N=0 and Q=0. It is to be noted that the following relations hold:

$$P_2 = P_1 \cdot (2m_b - 1)$$
$$P_2 = Q_1 + P_3$$

$$P = Q_1 + P_3 \cdot \sqrt{m_d - m_c + 1}$$

Figure 7:
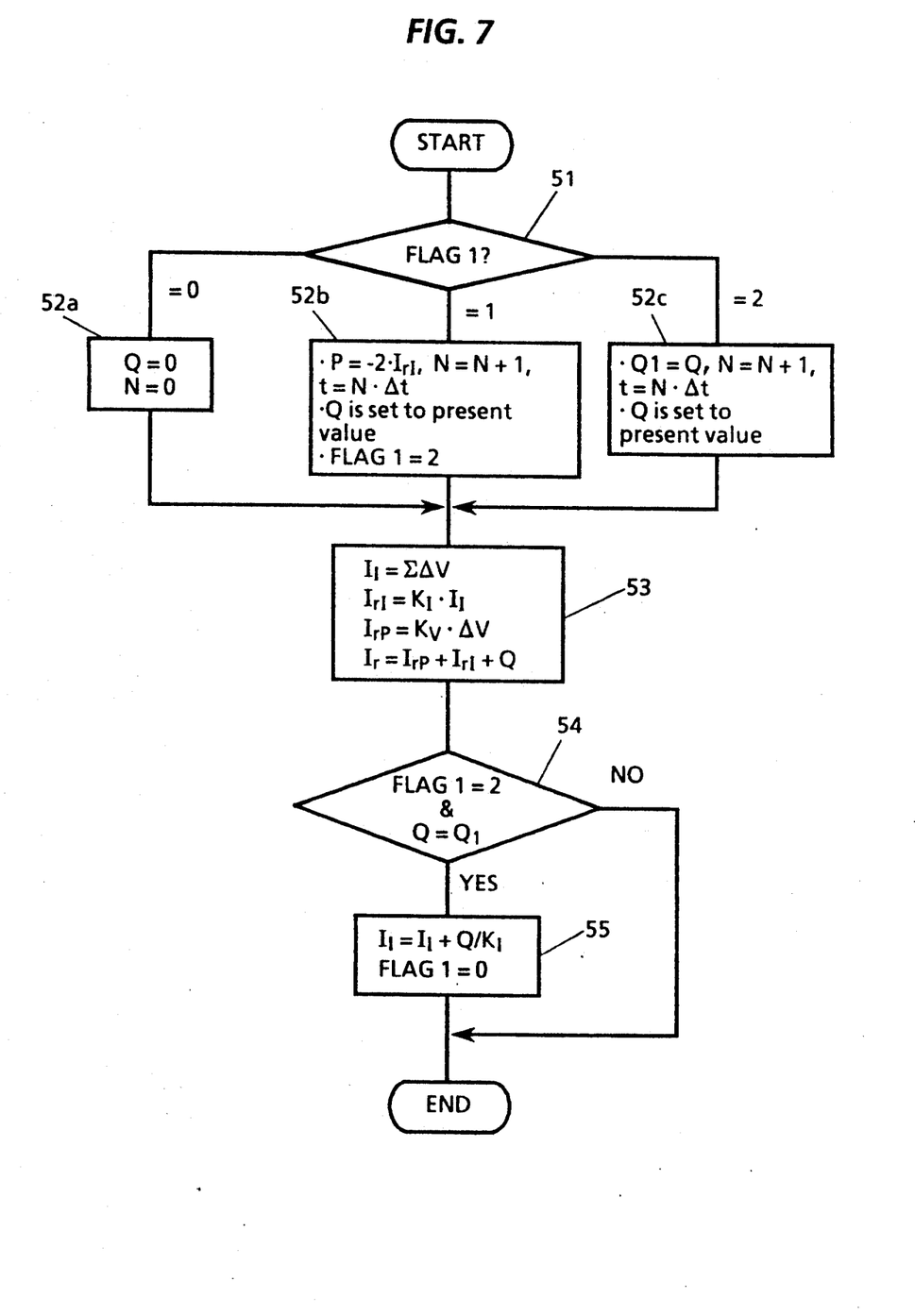
FIG. 7 is a flowchart illustrating the operation of a velocity control portion according to the invention.

The PI (proportional plus integral) action performed by the velocity control portion is described by referring to FIG. 7. First, the value of FLAG 1 is checked (step 51). If it is 0, the function output value Q is set to 0 (step 52a). If it is 1, then the final output value of the function FILTER 1 is set to the previous integration term $I_{rI}$ of the velocity control portion multiplied by $-2$, a function input which is defined as $t = N \times \Delta t$, where $\Delta t$ is a repeating period of a computing cycle of the microprocessor for the velocity control portion and N is a counted value of the counter that is counted upward at each computing operation. The time t and the counted value N are here set to zero (t=p and N32 1) at the time the FLAG 1 changes to 1 from 0; and then the value of FLAG 1 is set to 2. If the value of FLAG 1 is 2, then the previous output value Q of the function is saved on $Q_1$. Subsequently. the present output value of FILTER 1 is set to Q (step 52c). Thereafter, the processing is similar to the processing which is given by formulae (3) above and conducted by the prior art velocity control portion, i.e., $$\left. \begin{array}{l} I_I = \Sigma \Delta V \\ I_{rI} = K_I \cdot I_I \\ I_{rP} = K_v \cdot \Delta V \\ I_r = I_{rI} + I_{rP} + Q \end{array} \right\} \quad (4)$$

Additionally, the instructed current value I is calculated (step 53).

Finally, the rate of change of the output value of FILTER 1 is calculated by taking the difference $Q - Q_1$. If it is 0, and if FLAG 1 is 2, then arithmetic operations given by $$\left. \begin{array}{l} I_I = I_I + Q/K_I \\ \text{FLAG } 1 = 0 \end{array} \right\} \quad (5)$$

are performed (step 54).

Where I-P action is performed, formulae (4) are replaced by $$\left. \begin{array}{l} I_I = \Sigma \Delta V \\ I_{rI} = K_I \cdot I_I \\ I_{rp} = K_v \cdot V_d \\ I_r = I_{rI} - I_{rP} + Q \end{array} \right\} \quad (6)$$

Figure 8:
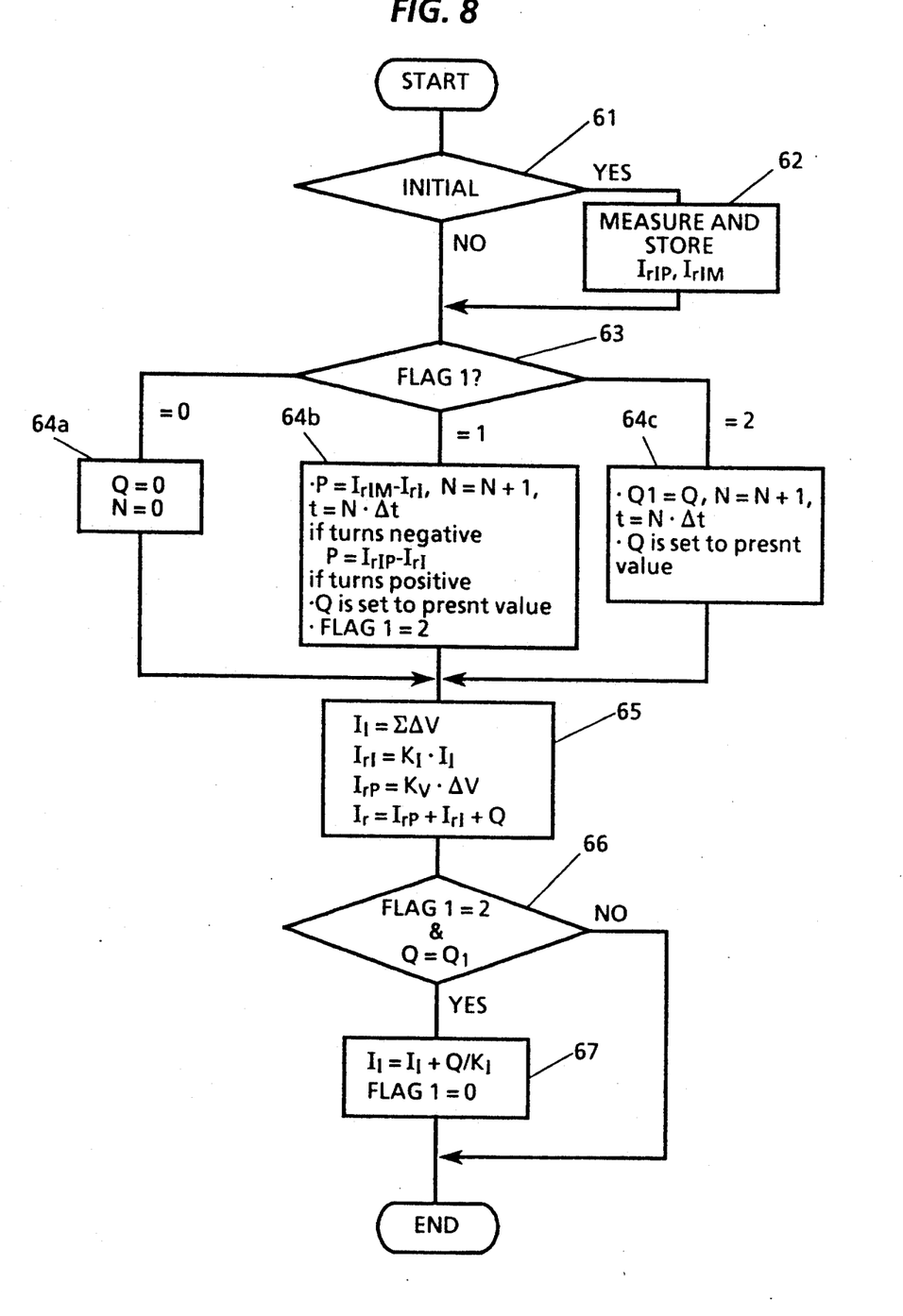
FIG. 8 is a flowchart illustrating the operation of another velocity control portion according to the invention.

FIG. 8 is a flowchart illustrating another example of PI action performed by the velocity control portion 12. First, a decision is made to see whether the processing is to be the initial processing (step 61). If so, for the preliminary stage, the motor is run both forward and rearward at an appropriate constant velocity. After the motor settles itself into a stationary state, the value of the integration term of the velocity control portion is stored in $I_{rIP}$ and $I_{rIM}$ (step 62). Then, normal operation is started. The value of FLAG 1 is checked (step 63). If it is 0, the output value Q of the function is set to 0 (step 64a). If it is 1, if the motor action changes from a positive value to a negative value, while $I_{rIM}-I_{rI}$ changes from a negative value to a positive value, then $I_{rIP}-I_{rI}$ is set to the value of the final function output value P, and the output value of FILTER 1 whose function input t was set to $t=N \times \Delta t$ is set to Q. The value of FLAG 1 is set to 2 (step 64b). If the value of FLAG 1 is 2, then the previous output value Q of the function is saved on $Q_1$. Thereafter, the present output value of FILTER 1 is set to Q (step 64c). Subsequently, processing given by formulae (4) is performed, and the instructed current value $I_r$ is calculated (step 65). Finally, the rate of change of the output value of FILTER 1, or Q -$Q_1$, is calculated. If it is 0, and if FLAG 1 is 2, then processing given by formulae (5) is conducted (step 66).

In case of I-P action, formulae (4) are replaced by formulae (6).

When the motor begins to move, processing similar to the processing performed on reversal of the direction of the velocity is conducted except that FLAG 1 in the velocity control portion 12 is varied from 0 to 1 when the motor velocity $V_d$ changes from 0 to a nonzero value. Some modified examples are next described.

Where the stationary value of the integration term of the velocity control portion changes according to posture as in a robot, FLAG 1 is changed from 0 to 1 in the processing on detection of reversal of the direction of the velocity. Additional processing for setting the integration term of the velocity control portion to $I_{rIP}$ or $I_{rIM}$ is added to the above processing to update $I_{rIP}$ or $I_{rIM}$, thus coping with changes in the stationary value. Generally, step 0 can be omitted by the addition of this processing.

In particular, if IrIP and $I_{rIM}$ are interrelated as given by $$I_{rIP} = \alpha \cdot I_{rIM} - \beta$$

where $\alpha$ and $\beta$ are constants and previously known by experiments or calculations, and if they do not change during the operation, then the final output value P of the function when FLAG 1=1 can be given by using the integration term $I_{rI}$ of the velocity control portion. The function is given by $$P = (\alpha - 1) \cdot I_{rI} + \beta$$

provided that the value changes from a positive value to a negative value and given by $$P = (1 - \alpha) \cdot I_{rI} - \beta$$

provided that the value varies from a negative value to a positive value. Thus, it is not necessary to store either $I_{rIP}$ or $I_{rIM}$. Consequently, only simple processing is required. Where the value corresponding to friction is previously known by calculations, actual measurement, or state observer's technique step 62 of FIG. 8 can be omitted. The final value P of the funtion can be determined by using that value instead of $I_{rIP}$ or $I_{rIM}$. Also, the processing of FILTER 1 can be omitted by adding a filter of an exponential function to the output stage of the velocity control portion. This can be done whether the direction of the velocity of the motor is reversed or rotation is started.

Figure 9:
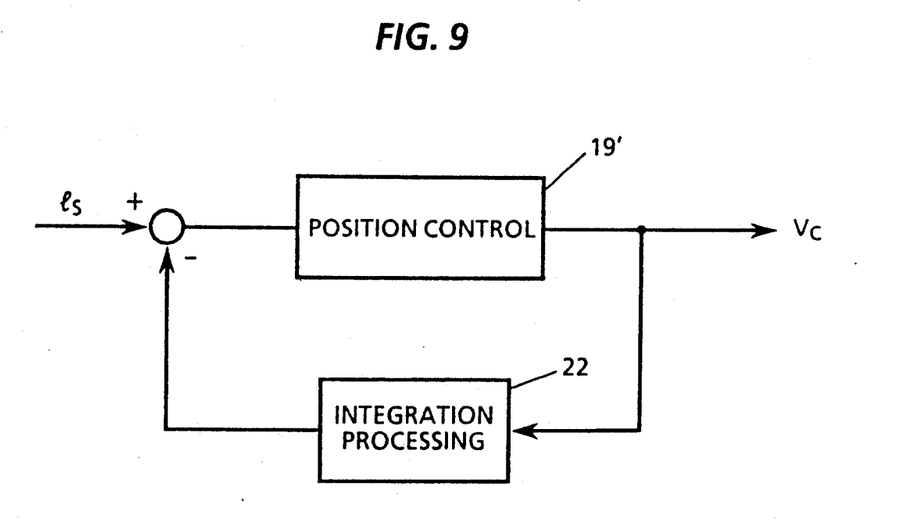
FIG. 9 is a block diagram illustrating processing for finding a value which corresponds to the instructed velocity and is used to detect reversal of the direction of the rotation.

Detection of reversal of the direction of the velocity can be regarded as a change in the sign of the instructed velocity value $V_s$. Alternately, arithmetic processing shown in FIG. 9 is conducted, using a processing portion 19' equivalent to the position control portion 19, and an integration processing portion 22 to calculate the value $V_c$ corresponding to the instructed velocity, from the instructed position value $l_s$ generated from the command function generator. The change in the sign is detected, or the change in the sign of the estimated velocity value using a state observer is detected. Where the stationary velocity deviates, depending on the type of the instruction or the type of control system, reversal of the direction of the motor velocity $V_d$ is regarded as occurring after a lapse of a given time from the instant at which the sign of the instructed velocity value $V_s$, or of the value $V_c$ corresponding to the instructed velocity, changes.

A differentiation element can be added to the function portion, and the output value can be added to the integration term of the velocity control portion so that the output value of the function may be reflected in the instructed current value.

The same principles can be applied to PD or I-PD control provided by the velocity feedback system whose control portion includes a differentiation element. Also, the principles can be applied irrespective of the kind of the servo motor used, i.e., whether it is a DC servo motor or an AC servo motor.

Where the characteristics of the friction torque differ, depending on whether the direction of the rotation of the motor is positive or negative, the first embodiment of the present invention can be applied simply by establishing the relation $$P = -\alpha \cdot I_{rI}$$

where $\alpha$ is a constant, without using either the second or third embodiment. The value of the constant $\alpha$ may be changed, depending on whether the direction is positive or negative. The kind of function and time constant may be changed on reversal of the direction.

As described thus far, in accordance with the present invention, after the instructed motor velocity changes from a positive value to a negative value or vice versa, or after the detected motor velocity changes from a positive value to a nonpositive value, or from a negative value to a nonnegative value, or after the instructed velocity changes from zero to a nonzero value, the value of the integration element of the velocity control portion is varied from the present integrated value to a negative or positive stationary value according to function. The output value is added to the instructed current value or to the integration term.

In this manner, by making the velocity follow the characteristic of the function, the integration term of the velocity control portion or the instructed current value can be changed quickly through a filter so as to overcome friction resulting from the instant of reversal of the velocity direction or from the beginning of rotation. Where the characteristic of the friction torque differ, depending on the direction, i.e., especially where the effect of gravity cannot be neglected, the compensation can be quickly and appropriately made upon reversal of the direction. Hence, the delay in the servo system due to friction torque can be largely compensated.

Accordingly, by applying the present invention to a servo motor control apparatus for use with a numerically controlled machine, the machining error produced on reversal of the direction of rotation o at the beginning of the rotation can be made much smaller than heretofore. Consequently, improvements in machining accuracy and quick response of the motor can be accomplished.

INDUSTRIAL APPLICABILITY

The present invention can find applications where the servo mechanism is required to have a high resolution such as with accurate machining, semiconductor fabrication, and a spherical lens machining.

We claim:

1. A servo motor control apparatus having a motor velocity feedback loop, with a motor torque feedback loop or motor current feedback loop formed inside the velocity feedback loop, a velocity control portion comprised of a microcomputer, and a controller included in the velocity control portion and having at least a proportional element and an integration element, said servo motor control apparatus comprising means connected to reverse the output value of the integration element of the velocity control portion with a function that smooths stepwise changes of an input to said velocity control portion and to add the output value of the integration element either to an instructed current value or to the integration element after an instructed motor velocity changes from a positive value to a negative value or vice versa, or after the detected velocity of the motor changes from a positive value to a nonpositive value, or from a negative value to a nonnegative value.

2. A servo motor control apparatus having a motor velocity feedback loop with a motor torque feedback loop or motor current feedback loop formed inside the velocity feedback loop, a velocity control portion consisting of a microcomputer, and a controller included in the velocity control portion and having at least a proportional element and an integration element, said servo motor control apparatus comprising means connected to change the output value of the integration element of the velocity portion with a function that smooths stepwise changes of an input to said velocity control portion so as to assume a value corresponding to positive or negative friction, depending upon whether the motor rotates, respectively, forwardly or rearwardly, and to add the output value of the integration element either to an instructed current value or to the output value of the integration element after an instructed motor velocity changes from a positive value to a negative value or vice versa, or after the detected velocity of the motor changes from a positive value to a nonpositive value, or from a negative value to a nonnegative value.

3. The servo motor control apparatus of claim 2, wherein after the instructed motor velocity changes from a positive value to a negative value or vice versa, or after the detected velocity of the motor changes from a positive value to a nonpositive value, or from a negative value to a nonnegative value, a value which overcomes positive or negative friction is made to change according to a function, and wherein the output value is added either to the instructed current value or to the integration term.

4. A servo motor control apparatus having a motor velocity feedback loop with a motor torque feedback loop or motor current feedback loop formed inside the velocity feedback loop, a velocity control portion consisting of a microcomputer, and a controller included in the velocity control portion and having at least a proportional element and an integration element, said servo motor control apparatus comprising means connected to change the output value of the integration element of the velocity control portion with a function that smooths stepwise changes of an input to said velocity control portion so as to assume a value corresponding to positive or negative friction, depending upon whether the motor rotates, respectively, forwardly or rearwardly, and to add the output value of the integration element either to an instructed current value or to the output value of the integration element after an instructed motor velocity changes from zero to a nonzero value.

5. The servo motor control apparatus of claim 4, wherein after the instructed motor velocity changes from zero to a nonzero value, a value overcoming positive or negative friction is made to change according to function, and wherein the output value is added either to the instructed current value or to the integration term.

* * * * *